Nov. 18, 1952  W. M. HUTCHINSON  2,618,662
PRODUCTION OF NAPHTHENE HYDROPEROXIDES
Filed Jan. 4, 1949
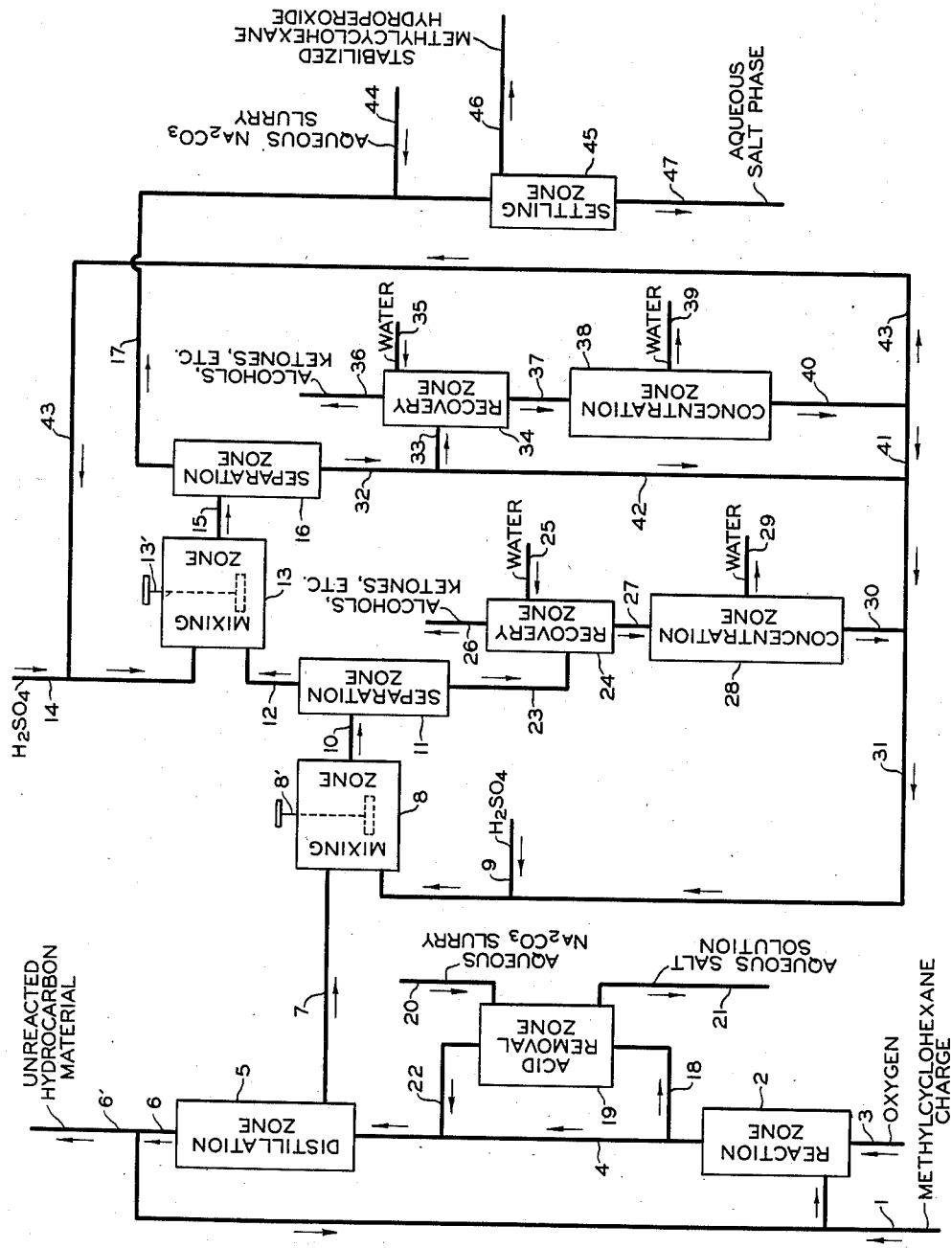
INVENTOR.
W. M. HUTCHINSON
BY Hudson and Young
ATTORNEYS Patented Nov. 18, 1952

2,618,662

UNITED STATES PATENT OFFICE 2,618,662

PRODUCTION OF NAPHTHENE HYDROPEROXIDES

William M. Hutchinson, Bartlesville, Okla., assignor to Phillips Petroleum Company, a corporation of Delaware Application January 4, 1949, Serial No. 69,231

15 Claims. (Cl. 260—610)

This invention relates to a process for the production of naphthene hydroperoxides. In one embodiment it relates to the production of naphthene hydroperoxides by the oxidation of naphthene hydrocarbons. In one specific embodiment this invention relates to the production of methylcyclohexane hydroperoxide by oxidation of methylcyclohexane and to the purification and recovery of the resulting hydroperoxide.

Naphthene hydroperoxides obtained from the oxidation of the corresponding naphthene hydrocarbons have numerous uses in the chemical industries. For example, these materials serve as intermediates in the manufacture of valuable organic acids, ketones, alcohols, and the like. Other applications of these materials lie in their use as initiators for polymerization processes, such as those involved in the manufacture of synthetic rubber; as oxidizing agents, and the like. For such applications the hydroperoxides may be employed per se, or in solutions in certain solvents, such as hydrocarbon solvents, the solvents often comprising the same naphthene hydrocarbon as that from which the hydroperoxide was derived. However, in either case, it is desirable that the naphthene hydroperoxides be free from contaminants which are concomitantly produced in the oxidation process by which the hydroperoxides are made. These contaminants comprise tars, alcohols, ketones, acids and various degradation products of the hydroperoxides and are found in greater or less amounts in the oxidation effluent.

The quantity of such contaminants can be held at a fairly low level by carrying out the oxidation at a low temperature, such as about 100° C. However, when so operating, the residence time in the reaction zone will be very long, often as much as six to eight hours to obtain a conversion of as much as two per cent. Obviously, such a process has serious disadvantages from a commercial viewpoint.

By raising the temperature of the reaction, naphthene hydrocarbons can be oxidized to the corresponding hydroperoxides in a small fraction of the time otherwise required. However, by so operating, there will always be some increase in the amount of degradation products formed, these degradation products often rendering the hydroperoxides unsuitable for many uses.

Removal of contaminating materials from organic hydroperoxides involves numerous problems. Distillation procedures are hazardous because of the well known thermal instability of the hydroperoxides. While unoxidized naphthenes can usually be safely removed by such means, the contaminating tars, alcohols, ketones, and the like are, for the most part, high boiling materials and the high temperatures involved in their removal by distillation, even at greatly reduced pressures, involves serious hazards. Furthermore, since many of these contaminants boil in or near the same range as the hydroperoxides themselves, sharp separations are difficult or impossible.

The hazards of elevated temperatures can be avoided by precipitating the hydroperoxides from hydrocarbon solutions as their alkali metal salts. However, such methods are inefficient because, on the one hand, appreciable amounts of impurities are carried down with said salts and, on the other hand, considerable amounts of valuable hydroperoxides are lost because, even with the most carefully selected hydrocarbon solvents, precipitation is far from quantitative. Furthermore, when so operating, the salts obtained will require further processing to liberate the hydroperoxide, obviously contributing substantially to production costs.

I have now discovered a process for the production of naphthene hydroperoxides by the oxidation of selected naphthene hydrocarbons with oxygen or oxygen-containing gas wherein a high rate of production of hydroperoxide is obtained, the said hydroperoxide being substantially free from contaminating tars, acids, ketones, alcohols, and various degradation products. The hydroperoxides manufactured by my process may be recovered either as a solution in the parent hydrocarbon or as the hydroperoxide alone as desired.

The process of my invention involves the steps of (1) oxidizing a naphthene hydrocarbon with an oxygen-containing gas under conditions for minimum residence time; (2) removal and recycling of all or a portion of the unoxidized naphthene hydrocarbon; (3) treating the hydroperoxide concentrate from (2) with a strong, nonvolatile mineral acid whereby the contaminants enter the acid phase; (4) separating the effluent from the acid treating step into an acid phase and a hydroperoxide phase; and (5) recovering purified hydroperoxide or hydroperoxide solution as a product of the process.

An object of this invention is to produce naphthene hydroperoxides by oxidation of naphthene hydrocarbons.

Another object of this invention is to provide a process for the production of naphthene hydroperoxides comprising integrated oxidation and purification steps whereby hydroperoxides substantially free from objectionable contaminants are obtained from an oxidation reaction conducted at a very rapid rate.

Still another object is to provide a process for the production of naphthene hydroperoxides from the oxidation of naphthene hydrocarbons wherein maximum efficiency in the oxidation step is realized through the operation of a novel purification step.

Still a further object of this invention is to provide a process for the production and purification of methylcyclohexane hydroperoxide.

Other objects and advantages of this invention will be apparent to those skilled in the art from the accompanying discussion and disclosure.

The process of my invention is applicable to the production of hydroperoxides from cycloparaffins and substituted cycloparaffins in which the ring structure contains at least five and not more than six carbon atoms, and which ring structure may contain one or more alkyl groups. The total number of carbon atoms in the cycloparaffin or naphthene hydrocarbon usable in the process of my invention, that is the number of carbon atoms in the cyclic structure and its constituents, will not be in excess of eight. Typical of these compounds are cyclopentane, cyclohexane, methylcyclohexane, trimethylcyclopentane, and the like.

It is an advantage of my process that the oxidation step can be operated under conditions such that higher conversions at much shorter residence times are obtained, thereby realizing significant economic advantages. Another important advantage of my invention lies in its applicability for the production of either naphthene hydroperoxides per se or a solution of a naphthene hydroperoxide in the parent hydrocarbon, said solution being obtainable in a broad concentration range. A further and very significant advantage lies in the high degree of purity of the hydroperoxide or hydroperoxide solution so obtained, the amounts of objectionable contaminants being reduced to a negligible amount by the purification treatment. A still further advantage of the present process lies in the fact that the contaminating ingredients removed in the acid phase can be recovered, refined and separated, thus providing a source of valuable alcohols, ketones, and the like which lower the overall production costs.

The advantages of my invention will be more apparent from a description of the accompanying diagrammatical drawing in which is shown one specific embodiment for carrying out the process of my invention. The specific naphthene hydrocarbon used in this illustration is methylcyclohexane. A narrow-boiling range hydrocarbon concentrate comprising 85 per cent methylcyclohexane is charged through line 1 to oxidation reaction zone 2 to which is also charged compressed oxygen from line 3. The feed rate of the methylcyclohexane charge is controlled to maintain a liquid residence time of 40 minutes in reaction zone 2 which is held at a temperature of 155° C. and at a pressure of 500 p. s. i. g. The oxygen feed rate is sufficient to supply 0.1 mol of oxygen per mol of methylcyclohexane. The oxidation effluent from reaction zone 2 is discharged through line 4 to distillation zone 5 where part or substantially all of the unreacted hydrocarbon material is taken overhead and returned to oxidation reaction zone 2 through lines 6 and 1. However, if desired, a portion of the unreacted hydrocarbon material may be removed from the system through line 6'. The distillation zone is operated, preferably under low pressure, so that the kettle temperature does not exceed about 25° C. The residue or reaction concentrate is passed from distillation zone 5 through line 7 to mixing zone 8 where it is intimately mixed by any suitable means, such as by mechanical stirrer 8', for an average time of 2 minutes with a 50 weight per cent aqueous solution of sulfuric acid introduced from line 9. The volume of acid added from line 9 to mixing zone 8 is controlled so that it is equal to one-tenth that of the residue or reaction products introduced from line 7. The resulting mixture is discharged through line 10 to separation zone 11 where it separates into an acid phase and a hydroperoxide phase. A residence time of 8 minutes is sufficient to allow the hydroperoxide phase to separate from the acid phase. The hydroperoxide phase is removed from separation zone 11 through line 12. The temperature in mixing zone 8 and in separation zone 11 is held at about −5° C. The partially purified hydroperoxide stream which passes through line 12 is charged into mixing zone 13 where it is again mixed by any suitable means, such as by mechanical stirrer 13', with one-tenth of its volume of 50 weight per cent sulfuric acid from line 14. The resulting mixture is discharged through line 15 into separation zone 16 where it separates into an acid phase and a hydroperoxide phase from which the hydroperoxide phase is removed through line 17. The conditions in mixing zone 13 and in separation zone 16 are similar to those maintained in mixing zone 8 and separation zone 11, respectively. In the acid treating steps the objectionable contaminants contained in the hydroperoxide phase are removed therefrom by the acid. To the stream of hydroperoxide passing through line 17 is added a slurry of sodium carbonate in water from line 44 and the resulting mixture is passed into settling zone 45 where it separates into a stabilized hydroperoxide phase and an aqueous salt phase. The carbonates, bicarbonates, and hydroxides of the alkali metals, the hydroxides of the alkaline earth metals, and amines such as morpholine, triethanolamine, and the like can also be used in this step. The basic stabilized hydroperoxide phase is removed through line 46 and the aqueous salt phase is discharged through line 47.

If desired, the acidic contaminants produced in the oxidation step may be removed from the effluent from reaction zone 2 by passing the effluent through lines 4 and 18 to acid removal zone 19 wherein a sufficient amount of a 25 weight per cent sodium carbonate slurry in water from line 20 is added to neutralize said acidic contaminants contained therein and which are removed through line 21 while the hydrocarbon phase comprising the hydroperoxide, alcohols, ketones, tars, and the like is discharged through lines 22 and 4 to distillation zone 5 for further treatment and purification. Two advantages are gained by employing this variation; namely, the decomposition of hydroperoxide is minimized in distillation zone 5, and also less sulfuric acid from lines 9 and 14 need be used in subsequent purification steps. It is to be understood that an aqueous slurry of any of the alkali metal carbonates or bicarbonates and hydroxides of the alkaline earth metals may be used in treating the effluent from the reaction zone.

The acid phase removed from separation zone 11 through line 23 is discharged into products recovery zone 24 where water from line 25 is used to dilute the acid phase. Recovery zone 24 should be held below 20° C. for best results. Sufficient water should be added so that the resulting aqueous phase contains from about 10 to 15 weight per cent acid. The oxygenated products, comprising alcohols, ketones and the like, separate and are removed through line 26 for further handling as desired. The dilute acid phase is discharged through line 27 to concentration zone 28 where water is evaporated and removed through line 29 and the recovered sulfuric acid is recycled through lines 30, 31 and 9 to mixing zone 8. The acid phase from separation zone 16 is discharged through line 32 and may be utilized in several ways. The stream may be passed through line 33 to recovery zone 34 where the acid is diluted with water from line 35, the alcohols, ketones and the like separate and are removed from recovery zone 34 through line 36 for further handling as desired, and the dilute acid is discharged through line 37. This acid may be concentrated in concentration zone 38, the water evaporated and taken off through line 39, and the recovered acid discharged through line 40. This acid may be recycled to mixing zone 8 through lines 41, 31 and 9 or to mixing zone 13 through lines 43 and 14. Another alternative for the employment of the acid in line 32 is to recycle part of it through lines 42, 31 and 9 directly to mixing zone 8. In this case, the acid in line 9 is made sufficiently concentrated to bring the strength of the mixture to 50 weight per cent.

In some instances it may be advantageous to use more than two series of mixing zones and separation zones. However, the above example illustrates the principles involved in this process.

In the case described in connection with the drawing, the concentrate contained in line 7 comprises 13 weight per cent methylcyclohexane hydroperoxide, 25 weight per cent alcohols, ketones, tars, and the like, and 62 weight per cent unreacted hydrocarbon; and the material contained in line 46 comprises 15 weight per cent methylcyclohexane hydroperoxide, and less than 0.5 weight per cent alcohols, ketones and other contaminants, in unreacted hydrocarbon.

In the accompanying diagrammatic drawing, reference to some of the equipment such as pumps, gauges, and the like which obviously would be necessary to actually operate the process have been intentionally omitted. Only sufficient equipment has been shown to illustrate the process and it is intended that no undue limitation be read into this invention by reference to the drawing and discussion thereof.

The oxidation reaction is carried out at a temperature in the range of from about 100° C. to 175° C.; however, to gain the best advantage of my process I prefer to operate at a temperature range from 135° C. to 165° C., and most preferably at from 155° C. to 160° C. The pressure under which the oxidation reaction is carried out varies from about 150 p. s. i. g. to about 4,000 or more p. s. i. g. The residence is held at the minimum time that is necessary for utilization of from 50 per cent to substantially 100 per cent of the influent oxygen. Depending on the temperature employed, this time ranges from about 300 minutes to about 1 minute, and preferably in the range of from about 60 to about 10 minutes. The partial pressure of the oxygen employed in the process ranges from 20 to 1,000 p. s. i. g., and the oxygen may be in a mixture of inert gases as in air or may be employed in a pure condition. Preferably, the oxygen is added to the reaction zone at such a rate as to maintain a supply therein of from 0.01 to 1 mol of oxygen per mol of the naphthene; however, in some cases more or less oxygen may be added.

The naphthene hydrocarbons applicable in my process are preferably employed as concentrates comprising from 50 to 100 per cent of the given naphthene, the remaining hydrocarbons in the concentrate being preferably paraffinic hydrocarbon material; however, in some cases, other hydrocarbon material may be used. The naphthene hydrocarbon or naphthene hydrocarbon concentrate may be obtained from any suitable source, such as by fractionation of natural gasoline or other petroleum products, or from hydrocyclization processes, by hydrogenation of certain aromatics, or the like.

The concentration of sulfuric acid used in the purification step of my process ranges from 45 to 70 weight per cent, preferably from 50 to 60 weight per cent. The temperature at which the hydroperoxide and acid phases are held while they are in contact ranges from −40 to +20° C., preferably from −15 to −5° C. However, acid over 55 weight per cent in concentration should not be used at temperatures in excess of 0° C. since otherwise decomposition ensues. When using an acid whose concentration exceeds 65 weight per cent care should be exercised that crystallization of the acid does not occur. This may be prevented by maintaining the acid feed above its melting point. Once the mineral acid has extracted the alcohols, ketones and the like from the hydroperoxide phase, crystallization is greatly retarded. The amount of acid used in the acid treating step may range from 0.1 to 2 volumes of acid per volume of hydroperoxide concentrate; however, larger or smaller volumes may be used if desired.

Phosphoric acid may be used in this process in concentrations ranging from about 70 to 85 weight per cent based on orthophosphoric acid, and at temperatures ranging from −40 to 0° C.

When it is desired to recover the hydroperoxide in a hydrocarbon solution, it is preferred that the crude naphthene concentrate charge contain that amount of the hydrocarbon necessary to give the desired concentration of purified hydroperoxide in hydrocarbon solvent. Adjustment of the concentration of hydroperoxide in the parent hydrocarbon is effected in an intermediate distillation, such as in distillation zone 5 of the drawing, prior to the acid purification step. It is desirable to recover purified hydroperoxide in a hydrocarbon diluent because it greatly decreases the decomposition rate of the hydroperoxide and lessens the hazards of explosion during its use or storage. The hydrocarbon diluent, in addition to the naphthene undergoing oxidation, may be paraffin hydrocarbons preferably those boiling near the boiling point of said naphthene hydrocarbon.

The following examples will serve to further illustrate this invention.

EXAMPLE I

Methylcyclohexane hydroperoxide was produced by two methods, i. e., by that of the present invention and by a method of the prior art heretofore considered a superior process. In the first case, according to the present invention, a concentrate comprising 75 per cent methylcyclohexane was oxidized at a temperature of 160–162° C., and under a pressure of 500 p. s. i. g., and with a residence time of 15 minutes. The flow rate of oxygen charged was 0.14 mol per mol of methylcyclohexane which was more than necessary for the needs of the reaction. The effluent was treated with an aqueous sodium carbonate slurry and the resulting treated material was found to contain 3.5 weight per cent methylcyclohexane hydroperoxide. After removing a portion of the unreacted hydrocarbon material by vacuum distillation the concentrate comprised 30 weight per cent methylcyclohexane hydroperoxide, 45 weight per cent other oxygenated products and 25 weight per cent unreacted hydrocarbon. After undergoing three extractions at −15° C., each with one-seventh volume of 55 weight per cent sulfuric acid per volume of concentrate, the resulting purified hydroperoxide concentrate was stabilized with an aqueous slurry of sodium carbonate.

In the second case, according to a superior method of the prior art, the same methylcyclohexane concentrate was oxidized at a temperature of 122–124° C., and under a pressure of 500 p. s. i. g., and with a residence time of 100 minutes, and with an oxygen flow of 0.05 mol per mol of methylcyclohexane. This was more oxygen than that consumed by the reaction. The effluent was treated with an aqueous sodium carbonate slurry to remove acids present and was then found to contain 2.2 weight per cent methylcyclohexane hydroperoxide and 1.6 weight per cent other oxygenated products. This solution was concentrated, by distilling off part of the unreacted hydrocarbon under vacuum, to yield a concentrate which comprised 30 weight per cent hydroperoxide, 23 weight per cent other oxygenated products, and 47 weight per cent unreacted hydrocarbon. The sodium salt of the hydroperoxide was precipitated by treating the concentrate at 0° C. with 45 per cent sodium hydroxide. The resulting slurry, comprising the sodium salt, unreacted sodium hydroxide, alcohols, ketones and the like, was treated with dilute acid to recover the hydroperoxide which was recovered as a solution in heptane. The purification process was repeated because impurities persisted in the hydroperoxide concentrate after the first purification step. After the second precipitation with sodium hydroxide and liberation with acid, the concentrate was stabilized by the addition of a slurry of sodium carbonate in water.

The improvements in my process over the method of the prior art are demonstrated by the data in Table I. Therein are given the resulting concentrations of methylcyclohexane hydroperoxide in hydrocarbon solution and also the total contaminants in the purified concentrates, the yields of hydroperoxide based on the mol produced per mol of methylcyclohexane oxidized, and the productivity of each process expressed in gallons of pure hydroperoxide produced per gallon of reactor space per day.

*Table I*

| Process | ROOH Conc. (wt. percent) | Contaminants (wt. percent) | Yield ROOH (Mol percent) | Productivity |
|---|---|---|---|---|
| Present | 47 | <0.5 | 50 | 2.2 |
| Prior Art | 47 | 2 | 43 | 0.16 |

EXAMPLE II

The same methylcyclohexane concentrate as used in part one of Example I above was oxidized at a temperature of 160–162° C. and under a pressure of 500 p. s. i. g., and with 15 minutes residence time. The flow-rate of oxygen charged was 0.14 mol per mol of methylcyclohexane which was more oxygen than was necessary for the needs of the reaction. The resulting material was treated with an aqueous sodium carbonate slurry and the resulting product was found to contain 3.5 weight per cent methylcyclohexane hydroperoxide. After removing a portion of the unreacted hydrocarbon material by vacuum distillation the concentrate comprised 30 weight per cent methylcyclohexane hydroperoxide, 45 weight per cent other oxygenated products and 25 weight per cent unreacted hydrocarbons. To one part of this concentrate was added six parts pentane and to one hundred volumes of this solution was added four volumes of 45 per cent aqueous sodium hydroxide. A voluminous precipitation resulted. This precipitate was removed and treated with 50 per cent excess of 25 per cent sulfuric acid at a temperature of 0° C. On multiple extraction with another six parts of pentane a crude peroxidic solution was obtained. The precipitation, acidification, and extraction were repeated four times. After the fifth extraction part of the pentane was distilled under vacuum to yield a purified sample of methylcyclohexane hydroperoxide in pentane. This sample was found to contain 47 weight per cent methylcyclohexane hydroperoxide and 5 per cent contaminants, and represented a yield of 14 per cent of theoretical. The productivity as expressed in terms of gallons per gallon reactor space per day was 0.62. This third run covers an operation in which oxidation was carried out at an elevated temperature and short residence time but without the purification step of the present invention.

EXAMPLE III

One hundred parts of concentrate taken from line 7 (see drawing), as produced in the first part of Example I, was subjected to vacuum evaporation at 30° C. to remove most of the hydrocarbon present. The residue, consisting of 78 parts by weight, was extracted five times, using in each case five parts by weight of 50 weight per cent aqueous sulfuric acid at 0° C. A centrifuge was used to separate the viscous supernatant hydroperoxide layer from the acid layer after each extraction. After washing with a sufficient amount of saturated sodium bicarbonate to neutralize the sulfuric acid present, 15 parts of 90 per cent methylcyclohexane hydroperoxide concentrate was obtained in a condition suitable for storage at room temperature.

EXAMPLE IV

A sample of a highly colored, impure methylcyclohexane hydroperoxide concentrate comprising approximately 14 per cent hydroperoxide and about an equal percentage of alcohols, ketones, acids and the like was produced from the oxidation of methylcyclohexane by the oxidation step employed in the first part of Example I previously described. This sample was divided into five equal portions. After cooling to 5° C., each portion was treated with one-seventh of its volume of sulfuric acid of varying concentrations. The mixtures were agitated by shaking intermittently for 15 minutes after which they were allowed to stand until the hydroperoxide separated as a supernatant layer. Purification was indicated by absence of color in the hydroperoxide. Tests were made to determine the weight percent recovery after treatment. Results of these runs are tabulated below.

*Table II*

| Conc. H$_2$SO$_4$ Used | Temp., °C. | Color Product | Weight percent Recovery ROOH present in original concentrate |
|---|---|---|---|
| 50 | 5 | Clear | 90 |
| 60 | 5 | do | 80 |
| 70 | 5 | do | 25 |
| 45 | 5 | do | |
| 40 | 5 | Dark | |

It is to be understood that this invention should not be unnecessarily limited to the above discussion and description and that modifications and variations may be made without departing from the invention or from the scope of the claims.

What is claimed is:

1. An improved process for the production of a naphthene hydroperoxide, which comprises passing a hydrocarbon mixture containing at least 50 per cent of a naphthene having a least 5 and not more than 6 carbon atoms in the cyclic structure and having not more than a total of 8 carbon atoms in the molecule to a reaction zone maintained at a temperature in the range of from 135 to 165° C. and under a pressure in the range of from 150 to 4,000 pounds per square inch, introducing oxygen into said reaction zone at such a rate as to maintain therein a supply of from 0.01 to 1 mol of oxygen per mol of said naphthene, maintaining the residence time of said naphthene and oxygen in said reaction zone in the range of from 60 to 10 minutes, passing an effluent reaction mixture from said reaction zone to a distillation zone wherein a portion of the unreacted hydrocarbon mixture is removed and recycled to said reaction zone, directly passing a kettle product from said distillation zone to a treating zone where said kettle product is contacted with sulfuric acid having a concentration in the range of from 50 to 60 weight per cent whereby objectionable contaminants are removed in the acid phase, maintaining the temperature in said treating zone in the range of from −15 to −5° C., treating resulting combined effluent from said treating zone by a step consisting of separating same into an acid phase and a naphthene hydroperoxide phase, withdrawing said naphthene hydroperoxide phase and treating it with an aqueous slurry of an alkali metal carbonate, and recovering a hydrocarbon solution of a purified naphthene hydroperoxide as a product of the process, and recovering said objectionable contaminants from said acid phase and recycling the acid to said treating zone.

2. An improved process for the production of a naphthene hydroperoxide, which comprises passing a hydrocarbon mixture containing at least 50 weight per cent of a naphthenic hydrocarbon having at least 5 and not more than 6 carbon atoms in the cyclic structure and having not more than a total of 8 carbon atoms in the molecule to a reaction zone maintained at a temperature in the range of from 135 to 165° C. and under a pressure in the range of from 150 to 4,000 pounds per square inch, introducing oxygen into said reaction zone at such a rate as to maintain therein a supply of from 0.01 to 1 mol of oxygen per mol of said naphthenic hydrocarbon, maintaining the residence time of said naphthenic hydrocarbon and oxygen in said reaction zone in the range of from 60 to 10 minutes, passing an effluent reaction mixture from said reaction zone to a distillation zone wherein a portion of the unreacted hydrocarbon mixture is removed and recycled to said reaction zone, directly passing a kettle product from said distillation zone to a mixing zone where said kettle product is contacted with sulfuric acid having a concentration in the range of from 50 to 60 weight per cent, maintaining the temperature in said mixing zone in the range of from −15 to −5° C., treating resulting combined effluent from said mixing zone by a step consisting of separating same into an acid phase and a naphthene hydroperoxide phase, withdrawing said naphthene hydroperoxide phase and treating it with an aqueous slurry of an alkali metal carbonate, and recovering a hydrocarbon solution of a purified naphthene hydroperoxide as a product of the process.

3. The process of claim 2 wherein the naphthenic hydrocarbon is methylcyclohexane.

4. The process of claim 2 wherein the naphthenic hydrocarbon is dimethylcyclohexane.

5. The process of claim 2 wherein the naphthenic hydrocarbon is cyclohexane.

6. An improved process for the production of a naphthene hydroperoxide, which comprises passing a hydrocarbon mixture containing at least 50 weight per cent of a naphthene having at least 5 and not more than 6 carbon atoms in the cyclic structure and having not more than a total of 8 carbons atoms in the molecule to a reaction zone maintained at a temperature in the range of from 100 to 175° C. and under a pressure in the range of from 150 to 4,000 pounds per square inch, introducing oxygen into said reaction zone at such a rate as to maintain a supply of from 0.01 to 1 mol of oxygen per mol of said naphthene, maintaining the residence time of said naphthene and oxygen in said reaction zone in the range of from 300 minutes to 1 minute, passing an effluent reaction mixture from said reaction zone to a distillation zone wherein a portion of the unreacted hydrocarbon mixture is removed and recycled to said reaction zone, directly passing a kettle product from said distillation zone to a mixing zone where said kettle product is treated with sulfuric acid having a concentration in the range of from 45 to 70 weight per cent, maintaining the temperature in said mixing zone in the range of from −40 to +20° C., treating resulting combined effluent from said mixing zone by a step consisting of separating same into an acid phase and a naphthene hydroperoxide phase, withdrawing said naphthene hydroperoxide phase and treating it with an aqueous solution of an alkali metal carbonate, and recovering naphthene hydroperoxide as a product of the process.

7. A process for the manufacture of methylcyclohexyl hydroperoxide, which comprises passing a hydrocarbon concentrate containing methylcyclohexane to a reaction zone maintained at a temperature in the range of from 135 to 165° C. and under a pressure in the range from 150 to 4,000 pounds per square inch, introducing oxygen-containing gas into said reaction zone at such a rate as to maintain a supply of from 0.01 to 1 mol of oxygen per mol of methylcyclohexane, maintaining the residence time of methylcyclohexane and oxygen in said reaction zone in the range of from 60 to 10 minutes, passing an effluent reaction mixture from said reaction zone to a distillation zone wherein a portion of the unreacted hydrocarbon mixture is removed and recycled to said reaction zone, directly passing the kettle product from said distillation zone to a first mixing zone where it is contacted with sulfuric acid having a concentration in the range of from 50 to 60 weight per cent, maintaining the temperature in said first mixing zone in the range of from −40 to +20° C., passing the effluent from said first mixing zone to a first separation zone wherein said effluent mixture is separated into an acid phase and a hydroperoxide phase, directly passing said hydroperoxide phase to a second mixing zone where it is contacted with sulfuric acid having a concentration in the range of from 50 to 60 weight per cent, maintaining the temperature in said second mixing zone in the range of from −15 to −5° C., treating resulting combined effluent from said second mixing zone by a step consisting of separating same into an acid phase and a hydroperoxide phase, withdrawing said hydroperoxide phase and treating it with an aqueous slurry of an alkali metal carbonate, and recovering purified methylcyclohexyl hydroperoxide concentrate as a product of the process.

8. An improved process for the production of a naphthene hydroperoxide, which comprises passing a hydrocarbon mixture containing at least 50 weight per cent of a naphthene having at least 5 and not more than 6 carbon atoms in the cyclic structure and having not more than a total of 8 carbons atoms in the molecule to a reaction zone maintained at a temperature in the range of from 135 to 165° C. and under a pressure in the range of from 150 to 4,000 pounds per square inch, introducing oxygen into said reaction zone at such a rate as to maintain therein a supply of from 0.01 to 1 mol of oxygen per mol of said naphthene, maintaining the residence time of said naphthene and oxygen in said reaction zone in the range of from 60 to 10 minutes, treating an effluent reaction mixture from said reaction zone with an aqueous slurry of an alkali metal carbonate thereby removing acidic material produced in said reaction zone, passing the resulting treated reaction mixture to a distillation zone wherein a portion of the unreacted hydrocarbon mixture is removed and recycled to said reaction zone, directly passing a kettle product from said distillation zone to a mixing zone where said kettle product is contacted with sulfuric acid having a concentration in the range of from 50 to 60 weight per cent, maintaining the temperature in said mixing zone in the range of from −15 to −5° C., treating resulting combined effluent from said mixing zone by a step consisting of separating same into an acid phase and a naphthene hydroperoxide phase, withdrawing said naphthene hydroperoxide phase and treating it with an aqueous slurry of an alkali metal carbonate, and recovering a purified naphthene hydroperoxide as a product of the process.

9. An improved process for the production of a naphthene hydroperoxide, which comprises passing a hydrocarbon mixture containing at least 50 weight per cent of a naphthene having at least 5 and not more than 6 carbon atoms in the cyclic structure and having not more than a total of 8 carbon atoms in the molecule to a reaction zone maintained at a temperature in the range of from 100 to 175° C. and under a pressure in the range of from 150 to 4,000 pounds per square inch, introducing oxygen into said reaction zone at such a rate as to maintain a supply of from 0.01 to 1 mol of oxygen per mol of said naphthene, maintaining the residence time of said naphthene and oxygen in said reaction zone in the range of from 300 minutes to 1 minute, passing an effluent reaction mixture from said reaction zone to a distillation zone wherein a portion of the unreacted hydrocarbon mixture is removed and recycled to said reaction zone, directly passing a kettle product from said distillation zone to a mixing zone where said kettle product is contacted with phosphoric acid having a concentration in the range of from 70 to 85 weight per cent based on orthophosphoric acid, maintaining the temperature in said mixing zone in the range of from −40 to 0° C., treating resulting combined effluent from said mixing zone by a step consisting of separating same into an acid phase and a naphthene hydroperoxide phase, withdrawing said naphthene hydroperoxide phase and treating it with an aqueous solution of an alkali metal carbonate, and recovering a hydrocarbon solution of a purified naphthene hydroperoxide as a product of the process.

10. An improved process for the production of a naphthene hydroperoxide, which comprises passing a hydrocarbon mixture containing at least 50 weight per cent of a naphthenic hydrocarbon having at least 5 and not more than 6 carbon atoms in the cyclic structure and having not more than a total of 8 carbon atoms in the molecule to a reaction zone maintained at a temperature in the range of from 135 to 165° C. and under a pressure in the range of from 150 to 4,000 pounds per square inch, introducing oxygen into said reaction zone at such a rate as to maintain therein a supply of from 0.01 to 1 mol of oxygen per mol of said naphthenic hydrocarbon, maintaining the residence time of said naphthenic hydrocarbon and oxygen in said reaction zone in the range of from 60 to 10 minutes, passing an effluent reaction mixture from said reaction zone to a distillation zone wherein a portion of the unreacted hydrocarbon mixture is removed and recycled to said reaction zone, directly passing a kettle product from said distillation zone to a mixing zone where said kettle product is contacted with phosphoric acid having a concentration in the range of from 70 to 85 weight per cent based on orthophosphoric acid, maintaining the temperature in said mixing zone in the range of from −40 to 0° C., treating resulting combined effluent from said mixing zone by a step consisting of separating same into an acid phase and a naphthene hydroperoxide phase, withdrawing said naphthene hydroperoxide phase and treating it with an aqueous slurry of an alkali metal carbonate, and recovering a hydrocarbon solution of a purified naphthene hydroperoxide as a product of the process.

11. An improved process for the production of a naphthene hydroperoxide, which comprises passing a naphthenic hydrocarbon having at least 5 and not more than 6 carbon atoms in the cyclic structure and having not more than a total of 8 carbon atoms in the molecule to a reaction zone maintained at a reaction temperature in the range of from 100 to 175° C. and under a pressure in the range of from 150 to 4,000 pounds per square inch, introducing oxygen into said reaction zone at such a rate as to maintain a supply of from 0.01 to 1 mol of oxygen per mol of said naphthenic hydrocarbon, maintaining the residence time of said naphthenic hydrocarbon and oxygen in said reaction zone in the range of from 300 minutes to 1 minute, passing an effluent reaction mixture from said reaction zone to a distillation zone wherein a portion of the unreacted naphthenic hydrocarbon is removed and recycled to said reaction zone, directly passing a kettle product from said distillation zone to a treating zone and therein contacting said kettle product with mineral acid selected from the group consisting of sulfuric acid and phosphoric acid having a concentration in the range of from 45 to 70 and 70 to 85 weight per cent, respectively, maintaining the temperature in said treating zone in the range of from $-40$ to $0°$ C., treating resulting combined effluent from said treating zone by a step consisting of separating same into an acid phase and a naphthene hydroperoxide phase, and recovering a purified naphthene hydroperoxide as a product of the process.

12. An improved process for the manufacture of a naphthene hydroperoxide, which comprises passing a hydrocarbon concentrate containing a naphthene to a reaction zone maintained at a temperature in the range of from 100 to 175° C. and under a pressure in the range of from 150 to 4,000 pounds per square inch, introducing oxygen into said reaction zone at such a rate as to maintain the supply of from 0.01 to 1 mol of oxygen per mol of naphthene, maintaining the naphthene and oxygen in said reaction zone in the range of from 300 to 3 minutes, directly passing the effluent reaction mixture from said reaction zone to at least one treating zone where said reaction mixture is treated with sulfuric acid having a concentration in the range of from 45 to 70 weight per cent, maintaining the temperature in said treating zone in the range of from $-40$ to $+20°$ C., treating resulting combined effluent from said treating zone by a step consisting of separating same into an acid phase and a naphthene hydroperoxide phase, and recovering a purified naphthene hydroperoxide concentrate as a product of the process.

13. In a process for the manufacture of a naphthene hydroperoxide, which comprises oxidizing a naphthenic hydrocarbon with oxygen in a reaction zone maintained at a suitable oxidation temperature, passing the effluent reaction mixture from said reaction zone to a distillation zone wherein a portion of the unreacted hydrocarbons are removed and recycled to said reaction zone, the improvement which comprises directly treating the kettle product from said distillation zone in at least one treating zone with sulfuric acid having a concentration in the range of from 45 to 70 weight per cent, maintaining the temperature in said treating zone in the range of from $-40$ to $+20°$ C., treating resulting combined effluent from said treating zone by a step consisting of separating same into an acid phase and a naphthene hydroperoxide phase, and recovering a purified naphthene hydroperoxide concentrate as a product of the process.

14. In a process for the manufacture of a naphthene hydroperoxide, which comprises a naphthenic hydrocarbon with oxygen in a reaction zone maintained at a suitable oxidation temperature, passing the effluent reaction mixture from said reaction zone to a distillation zone wherein a portion of the unreacted hydrocarbons are removed and recycled to said reaction zone, the improvement which comprises directly treating the kettle product from said distillation zone in at least one treating zone with sulfuric acid having a concentration in the range of from 50 to 60 weight per cent, maintaining the temperature in said treating zone in the range of from $-15$ to $-5°$ C., treating resulting combined effluent from said treating zone by a step consisting of separating same into an acid phase and a naphthene hydroperoxide phase, and recovering a purified naphthene hydroperoxide concentrate as a product of the process.

15. In a process for the manufacture of a naphthene hydroperoxide which comprises, oxidizing a naphthenic hydrocarbon with oxygen in a reaction zone, passing a resulting reaction mixture effluent from said reaction zone into a distillation zone and therein removing unreacted hydrocarbons, the improvement which comprises passing a kettle product from said distillation zone into a treating zone and therein directly contacting said kettle product with mineral acid selected from the group consisting of sulfuric acid and phosphoric acid at a temperature of from $-40$ to $0°$ C., said sulfuric acid having a concentration of from 45 to 70 weight per cent and said phosphoric acid having a concentration of from 70 to 85 weight per cent, treating resulting combined effluent from said treating zone by a step consisting of separating same into an acid phase and a naphthene hydroperoxide phase, and recovering a purified naphthene hydroperoxide as a product of the process.

WILLIAM M. HUTCHINSON.

REFERENCES CITED

The following references are of record in the file of this patent:

UNITED STATES PATENTS

| Number | Name | Date |
|---|---|---|
| 2,270,175 | Tadema | Jan. 13, 1942 |
| 2,430,864 | Farkas et al. | Nov. 18, 1947 |
| 2,430,865 | Farkas et al. | Nov. 18, 1947 |
| 2,455,569 | Dickey | Dec. 7, 1948 |
| 2,472,152 | Farkas et al. | June 7, 1949 |